United States Patent [19]

Okamura et al.

[11] Patent Number: 5,492,283
[45] Date of Patent: Feb. 20, 1996

[54] TAPE CASETTE AND REEL SPRING THEREFOR

[75] Inventors: Masatoshi Okamura; Takashi Namioka; Haruo Shiba, all of Nagano, Japan

[73] Assignee: TDK Corporation, Tokyo, Japan

[21] Appl. No.: 97,321

[22] Filed: Jul. 26, 1993

Related U.S. Application Data

[63] Continuation of Ser. No. 733,086, Jul. 19, 1991, abandoned, which is a continuation of Ser. No. 335,617, Apr. 10, 1989, abandoned.

[30] Foreign Application Priority Data

Apr. 11, 1988 [JP] Japan .................................. 63-47711

[51] Int. Cl.⁶ .............................................. G11B 23/087
[52] U.S. Cl. .............................................. 242/345.2
[58] Field of Search .................................. 242/197, 199, 242/345.2; 29/806, 271

[56] References Cited

U.S. PATENT DOCUMENTS

| | | | |
|---|---|---|---|
| 4,656,549 | 4/1987 | Schoettle et al. | 360/132 |
| 4,687,157 | 8/1987 | Schoettle et al. | 242/199 |
| 4,770,367 | 9/1988 | Carroll | 242/199 |
| 5,195,696 | 3/1993 | Dong | 242/199 |

FOREIGN PATENT DOCUMENTS 0087796  9/1983  European Pat. Off. ................. 29/806

*Primary Examiner*—Daniel P. Stodola
*Attorney, Agent, or Firm*—Steinberg, Raskin & Davidson

[57] ABSTRACT

A tape cassette capable of permitting a reel spring to be readily and accurately positioned on a casing for its mounting to highly improve workability and productivity in manufacturing of the tape cassette. The tape cassette includes a reel spring which is abutted against tape reels for elastically holding them. The reel spring comprises a spring body formed at an intermediate portion thereof in a longitudinal direction thereof with a plurality of mounting holes through which the reel spring is mounted on an inner surface of an upper casing member. The spring body is provided on each of both sides thereof in the longitudinal direction with one or two positioning recesses, each of which is positioned adjacent to each of the mounting holes.

6 Claims, 8 Drawing Sheets

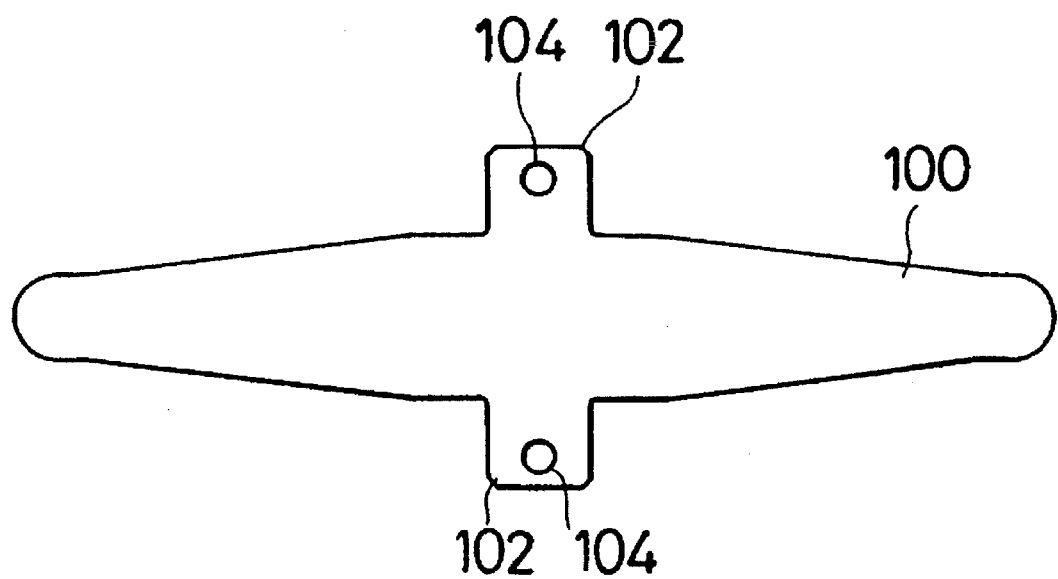

TAPE CASETTE AND REEL SPRING THEREFOR

This is a Continuation of application Ser. No. 07/733,086 filed on Jul. 19, 1991, now abandoned, which is a Continuation of application Ser. No. 07/733,086 filed on Jul. 9, 1991, now abandoned, which is a Continuation of application Ser. No. 07/335,617 filed on Apr. 10, 1989, now abandoned.

BACKGROUND OF THE INVENTION

1. Field of the Invention

This invention relates to a tape cassette for a video system, an audio system or the like, and more particularly to a tape cassette including a cover for selectively closing a front opening of a casing to sealedly protect a tape in non-use and a reel spring therefor.

2. Description of the Prior Art

A tape cassette used for a video recording and/or reproducing unit, an audio recording and/or reproducing unit or the like includes a reel spring mounted on an upper casing member of a casing for elastically holding tape reels having a tape wound thereon, resulting in keeping the tape reels stationary in the casing.

For this purpose, in a conventional tape cassette, a reel spring as indicated at reference numeral 100 in FIG. 12 is used. More particularly, the reel spring 100 is formed on both sides of a central portion thereof with a pair of projections 102 in a manner to be opposite to each other and outwardly extend therefrom, each of which is formed with a mounting hole 104, resulting in being formed into a substantially cross shape. The reel spring 100 is made of a leaf spring material. In the reel spring, the projections 102 formed with the mounting holes 104 are generally arranged in a row in a direction perpendicular to a longitudinal direction of the reel spring in order to ensure that mounting of the reel spring on a casing of a tape cassette is carried out at a position between the reels.

Such construction and configuration of the conventional reel spring 100 cause yields of the leaf spring material for the reel spring to be decreased due to the projections 102. Also, mounting of the reel spring on the casing through fitting between the mounting holes 104 and mounting bosses provided on the casing renders positioning of the reel spring in the longitudinal direction with respect to the casing highly troublesome. In particular, positioning of the reel spring based on its whole length causes a variation in the positioning. Thus, the above-described construction and configuration of the conventional reel spring fail to permit positioning of the reel spring with respect to the casing to be readily and accurately carried out, resulting in deteriorating workability and productivity of the tape cassette.

Accordingly, it would be highly desirable to develop a tape cassette which is capable of permitting a reel spring to be readily and accurately positioned and mounted on a casing and a reel spring which permits workability and productivity in manufacturing of the tape cassette to be significantly improved.

SUMMARY OF THE INVENTION

The present invention has been made in view of the foregoing disadvantage of the prior art.

Accordingly, it is an object of the present invention to provide a tape cassette which is capable of highly improving workability and productivity in manufacturing of the tape cassette.

It is another object of the present invention to provide a tape cassette which is capable of permitting a reel spring to be readily and accurately positioned on a casing for its mounting.

It is a further object of the present invention to provide a tape cassette which is capable of accomplishing saving of material in manufacturing of the tape cassette.

It is still another object of the present invention to provide a tape cassette which is capable of reducing its manufacturing cost.

It is yet another object of the present invention to provide a reel spring for holding tape reels which is capable of being readily and accurately positioned on a casing for its mounting.

It is even another object of the present invention to provide a reel spring for holding tape reels which is capable of housing a simplified construction and improving yields of materials used therefor in manufacturing of the reel spring.

It is still a further object of the present invention to provide a method for mounting a reel spring on a casing of a tape cassette which is capable of readily and accurately mounting the reel spring on the casing.

It is yet a further object of the present invention to provide an apparatus for mounting a reel tape on a casing of a tape cassette which is capable of readily and accurately mounting the reel spring on the casing.

In accordance with one aspect of the present invention, a tape cassette is provided. The tape cassette includes a casing in which a pair of tape reels having a tape wound thereon are rotatably arranged and a reel spring which is abutted against said tape reels for elastically holding the tape reels. The reel spring comprises a spring body formed at an intermediate portion thereof in a longitudinal direction thereof with a plurality of mounting holes through which the reel spring is mounted on the casing and provided on each of both sides thereof in the longitudinal direction with at least one positioning recess. The recess is positioned adjacent to each of the mounting holes and may comprise a cutout.

In accordance with another aspect of the present invention, a reel spring for holding tape reels arranged in a casing of a tape cassette is provided. The reel spring includes a spring body formed at an intermediate portion thereof in a longitudinal direction thereof with a plurality of mounting holes through which the reel spring is mounted on the casing. The spring body is provided on each of both sides thereof in the longitudinal direction with at least one positioning recess, which is positioned adjacent to each of the mounting holes.

In accordance with a further aspect of the present invention, a method for mounting a reel spring on a casing of a tape cassette which is provided with a plurality of mounting bosses is provided. The method includes the step of stacking a plurality of reel springs on one another, wherein each of the reel springs includes a spring body formed at an intermediate portion thereof in a longitudinal direction thereof with a plurality of mounting holes through which the reel spring is mounted on the casing and provided on each of both sides thereof in the longitudinal direction with at least one positioning recess. The recess is positioned adjacent to each of the mounting holes. The method also includes the steps of taking out the stacked reel springs one by one in a secure fusion and transferring the taken-out reel spring to a position above the casing, carrying out positioning of the reel spring in a longitudinal direction thereof through the recesses while holding the reel spring, downwardly moving the reel spring to fit the mounting holes on the mounting bosses of the casing, and subjecting the mounting boss to fusion for securing the reel spring with respect to the casing.

In accordance with still another aspect of the present invention, an apparatus for mounting a reel spring on a casing of a tape cassette which is provided with a plurality of mounting bosses is provided. The apparatus includes stacking means for stacking a plurality of reel springs on one another, wherein each of the reel springs includes a spring body formed at an intermediate portion thereof in a longitudinal direction thereof with a plurality of mounting holes through which the reel spring is mounted on the casing and provided on each of both sides thereof in the longitudinal direction with at least one positioning recess. The recess is positioned adjacent to each of the mounting holes. The apparatus also includes means for taking out the stacked reel springs one by one in a secure fusion and transferring the held reel spring in a horizontal and vertical directions to supply the reel spring to a position above the casing, positioning means including guide members movably abutted against the recesses of the reel spring to carry out positioning of the reel spring in a longitudinal direction thereof, and heating means for subjecting the mounting bosses of the casing on which the mounting holes of the reel spring are fitted to deformation by fusion for accurately mounting the reel spring on the casing.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein:

FIG. 12 is plan view showing a conventional reel spring.

DETAILED DESCRIPTION OF THE PREFERRED EMBODIMENT

Figure 1:
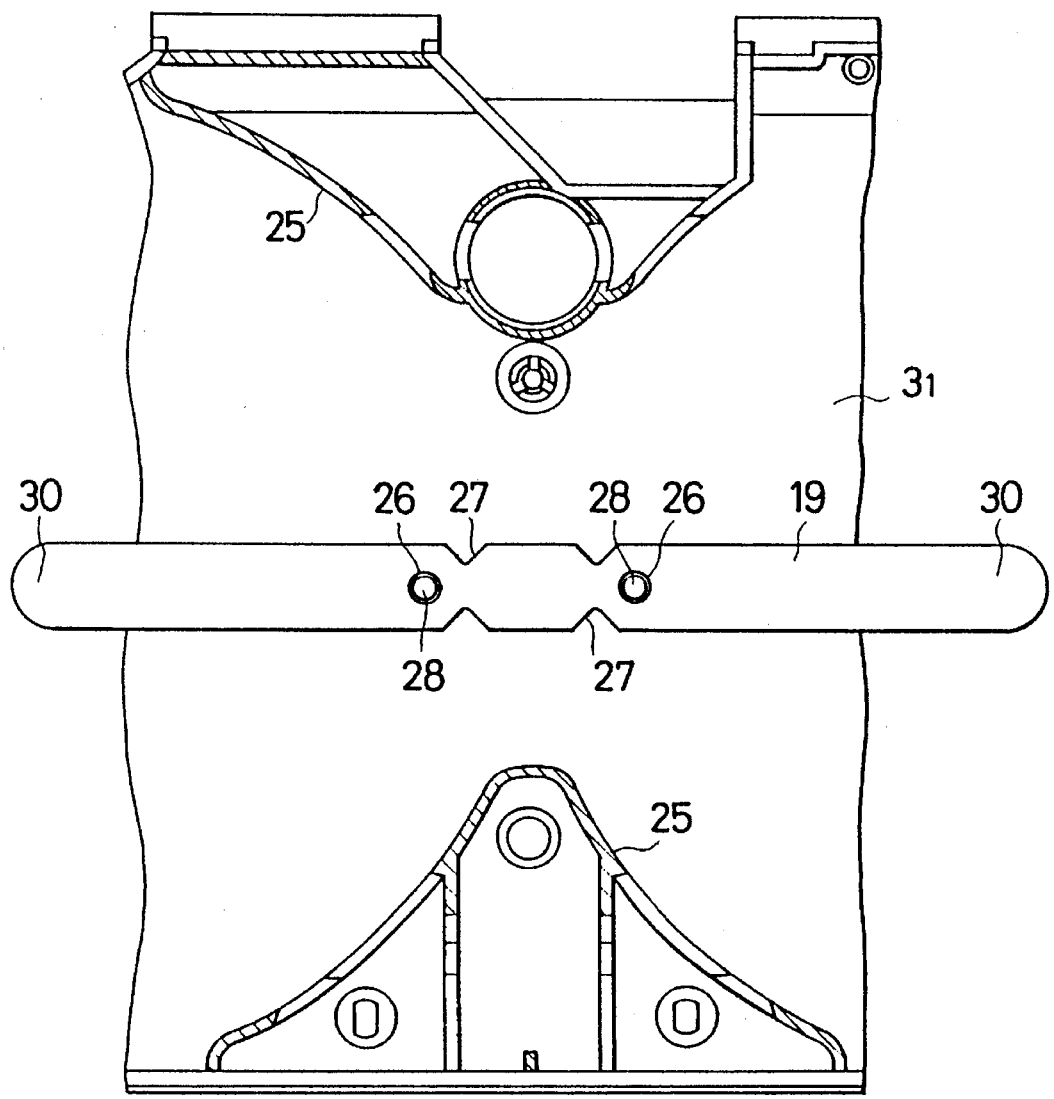
FIG. 1 is a fragmentary plan view showing an essential part of an embodiment of a tape cassette according to the present invention.

Now, a tape cassette and a reel spring therefor according to the present invention will be described hereinafter with reference to FIGS. 1 to 11C of the accompanying drawings, wherein like reference numerals designate like or corresponding parts throughout.

Figure 2:
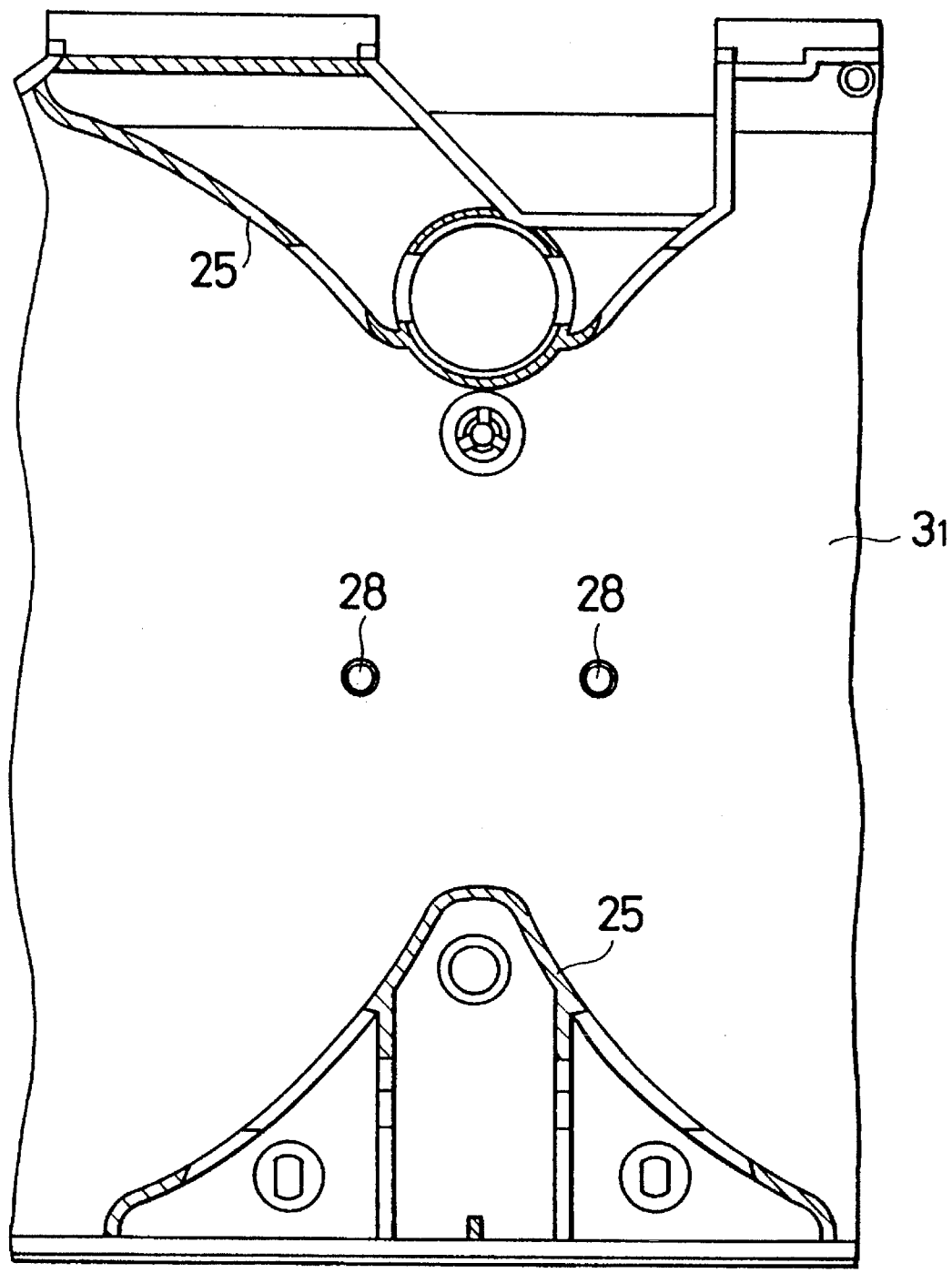
FIG. 2 is a fragmentary plan view of the tape cassette of FIG. 1 prior to the mounting of a reel spring on a casing.
Figure 3A:
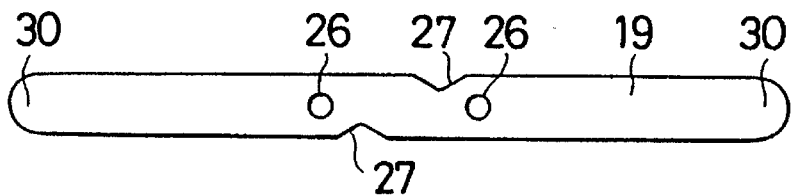
FIGS. 3A to 3F are plan views of a reel spring, each Figure illustrating a modification of a reel spring according to embodiments of the present invention.
Figure 3B:
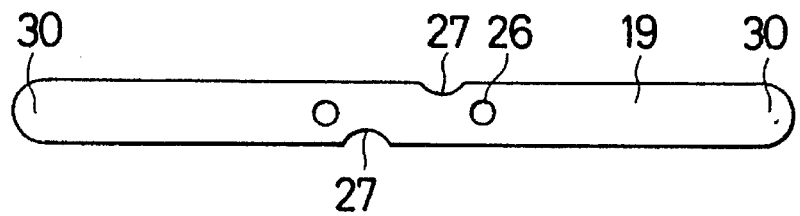
Figure 3C:
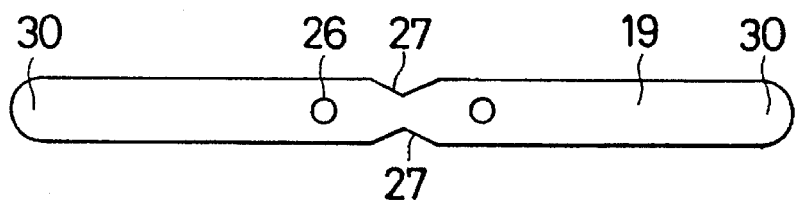
Figure 3D:
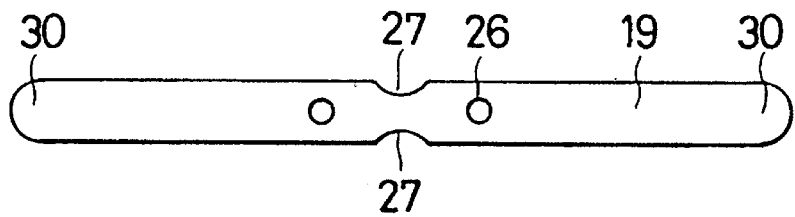
Figure 3E:
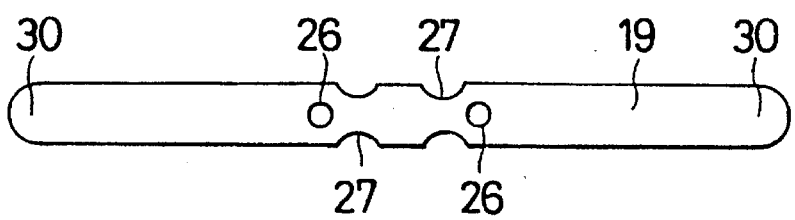
Figure 3F:
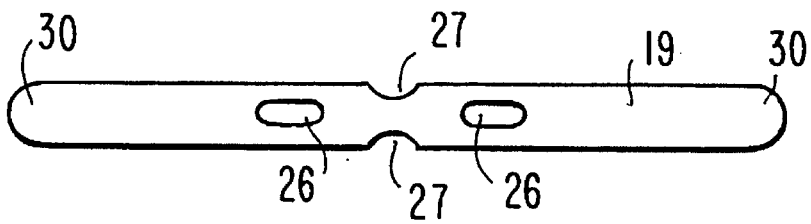
Figure 4:
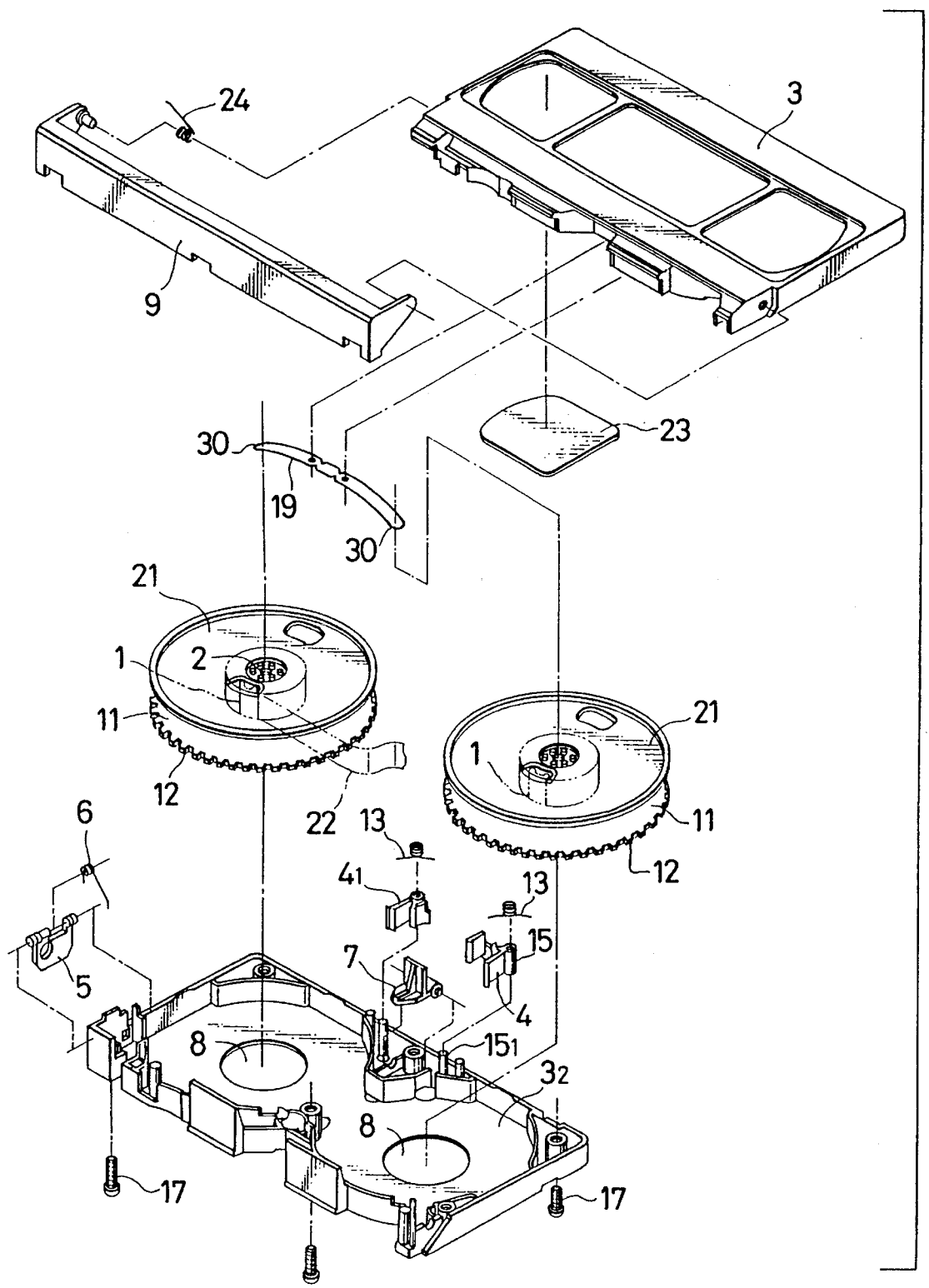
FIG. 4 is an exploded enlarged perspective view generally showing the tape cassette of FIG. 1.

FIGS. 1 to 4 illustrate an embodiment of a tape cassette according to the present invention. A tape cassette of the illustrated embodiment includes a casing 3, which comprises an upper casing member $3_1$ and a lower casing member $3_2$ joined together as shown in FIG. 4. In the lower casing member $3_2$ is rotatably mounted a pair of tape reels or reel hubs 11, The tape cassette also includes a reel spring 19 provided with a plurality of mounting holes 26 at an intermediate portion thereof in a longitudinal direction thereof. In the illustrated embodiment, the mounting holes are provided in a pair and arranged in a manner to be spaced from each other in the longitudinal direction, as shown in FIG. 1. Correspondingly, the upper casing member $3_1$ is provided on an inner surface thereof with a pair of mounting bosses 26 in a manner to correspond in number and position to the mounting holes 26 as shown in FIG. 2, so that the reel spring 19 may be mounted on the upper casing member $3_1$ through fitted engagement between the mounting holes 26 and the mounting bosses 28 in a manner to be forcedly abutted at both ends 30 thereof against reel centers 2 of the tape reel 11. The mounting holes 26 of the reel spring 19 may be securely fitted on the mounting bosses 28 by a suitable fixing method such as fusion of the bosses, melting of the bosses or the like. In the illustrated embodiment, the reel spring 19 is formed of a leaf spring material into a substantially rectangular shape which has substantially the same width or taper toward both ends of the spring 19 from its central portion and, as described above, is arranged so as to be forcedly abutted at its both ends 30 against the reel centers 2. Also, the reel spring 19 is formed on both sides of an intermediate portion thereof in its longitudinal direction with at least a pair of positioning means or recesses 27 as shown in FIGS. 1 and 3A to 3F.

The positioning recess 27 may be formed and arranged in such a manner as shown in FIGS. 3A to 3F. More particularly, they may comprise cutouts formed into a substantially V-shape. Alternatively, the recesses or cutouts 27 may be formed into a substantially semi-circular shape. Also, they may be point- or plane-symmetrically arranged in a manner to be right or obliquely opposite to each other.

The mounting holes 26 each may be fitted on the mounting bosses 28 which may be formed into a suitable shape such as, for example, a cylindrical shape or the like in a manner to be projected from the inner surface of the casing 3. It is convenient that at least one of the mounting holes 26 is formed into an elliptical shape which is elongated in the longitudinal direction of the reel spring as seen in FIG. 3F, resulting in facilitating mounting of the reel spring 26 on the casing 3 through fitted engagement between the mounting holes 26 and the mounting bosses 28.

The casing 3, as described above, is constituted by the upper and lower casing members $3_1$ and $3_2$ joined together. On a front side of the casing 3 is pivotally arranged a front cover 9 so as to selectively close a front opening of the casing 3. For this purpose, a lock element 5 provided with a spring 6 is arranged so as to constantly urge the front cover 3 to selectively lock the front cover 9 with respect to the casing 3. Such arrangement of the front cover may be carried out in a conventional manner. On the tape reels 11 is wound a tape 22 such as a magnetic tape in a manner to stretch therebetween, as shown in FIG. 4. The tape reels 11 each are formed on an outer periphery thereof with a locked portion 12. Correspondingly, in the lower casing member $3_2$ is pivotally arranged a reel braking lever 4 so as to be selectively engaged with the locked portion 12 of the tape reel 11 to lock it. The reel braking lever 4 includes a spring 13 which serves to constantly urge the reel braking lever 4 in a direction of engaging it with the locked portion 12 of the tape reel 11. The spring 13 includes a coiled portion and is forcedly abutted at one end thereof against the reel braking lever 4.

In FIG. 4, reference numerals 1, 8, 17, 21, 23, 24 and 25 designate clamps, holes for inserting shafts for the reels 11 therein, mounting screws, reel flanges, visual window plate, a spring for the front cover 9 and partitions, respectively. These members may be constructed in a conventional manner.

In non-use of the magnetic tape cassette of the illustrated embodiment constructed as described above, the front cover 9 closes the front opening of the casing 3 to sealedly receive the tape 22 in the casing 3 in safety and the reel braking levers 4 each are engaged with the locked portion 12 of each of the tape reels 11 to lock it. Also, the reel spring 19 is forcedly abutted at its both ends against the tape reels 11 to elastically hold them.

Figure 5:
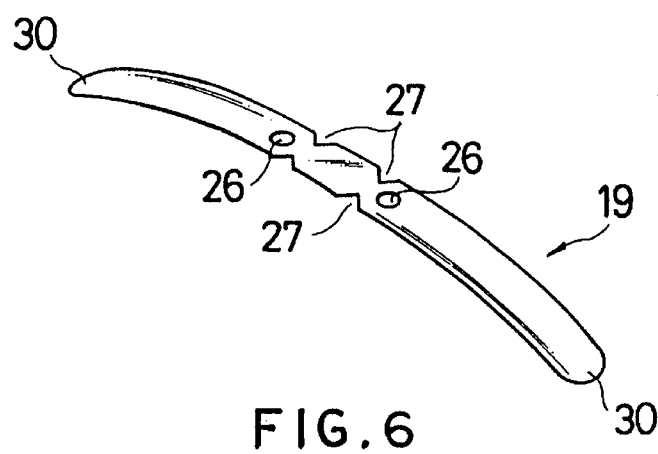
FIG. 5 is a perspective view showing a reel spring.

The above-described recesses 27 of the reel spring 19 may be formed in a pair on each of both sides of the reel spring 19 in a manner to be right opposite to one another as shown in FIGS. 1 and 5.

Now, the manner of mounting of the reel spring 19 shown in FIGS. 1 and 5 on the inner surface of the upper casing member $3_1$ will be described hereinafter.

The reel spring 19, as shown in FIG. 5, is formed in a manner downwardly curved in the longitudinal direction formed in order to ensure that both ends 30 elastically force the reel centers 2.

Figure 6:
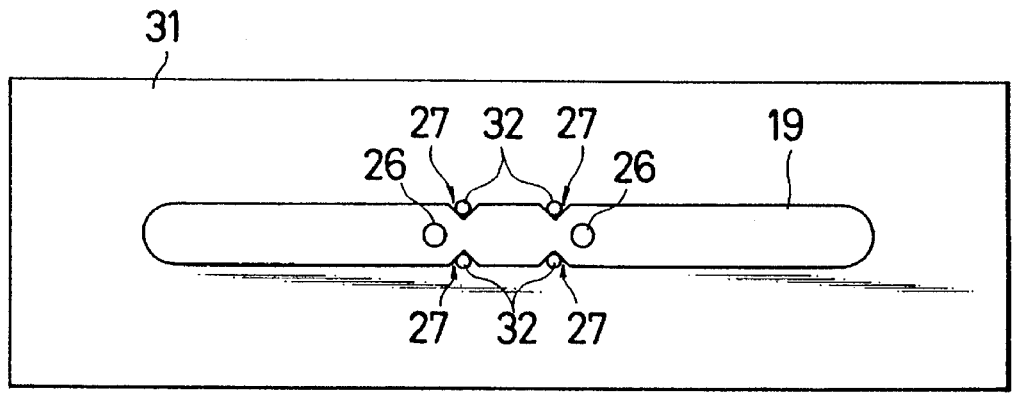
FIGS. 6 and 7 is a plan view and a front elevation view showing a plurality of reel springs stacked on one another on a magazine support, respectively.
Figure 7:
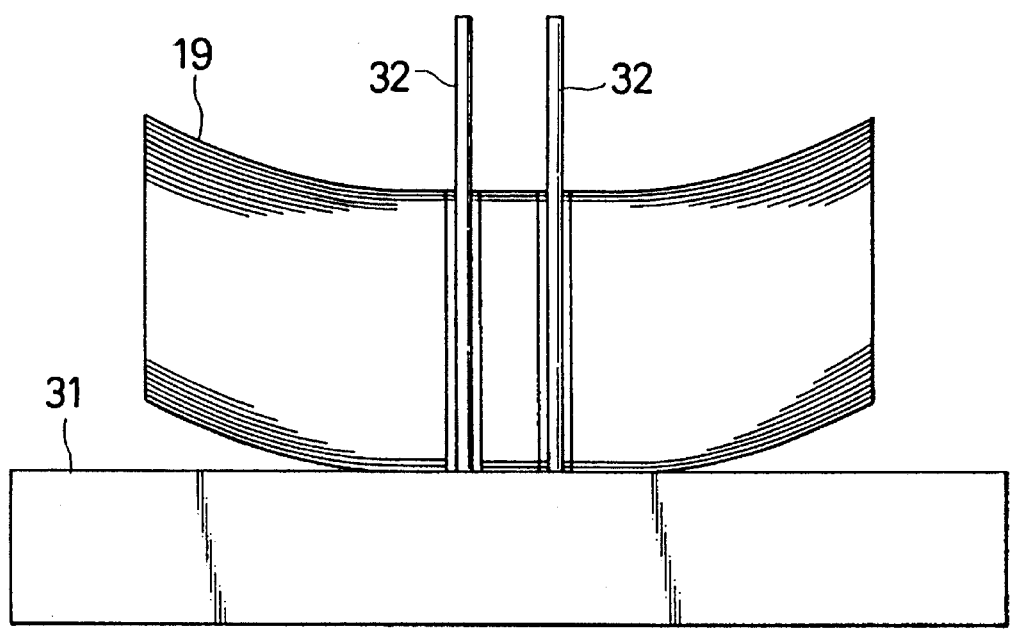

A plurality of the so-formed reel springs 19 are put on a magazine support 19 in a stacked manner for successive mounting, as shown in FIGS. 6 and 7, during which the recesses 27 of the so-stacked reel springs 19 are aligned with one another by guide shafts 32 arranged on the magazine support 31, resulting in the reel springs 19 being positionally regulated.

Figure 8:
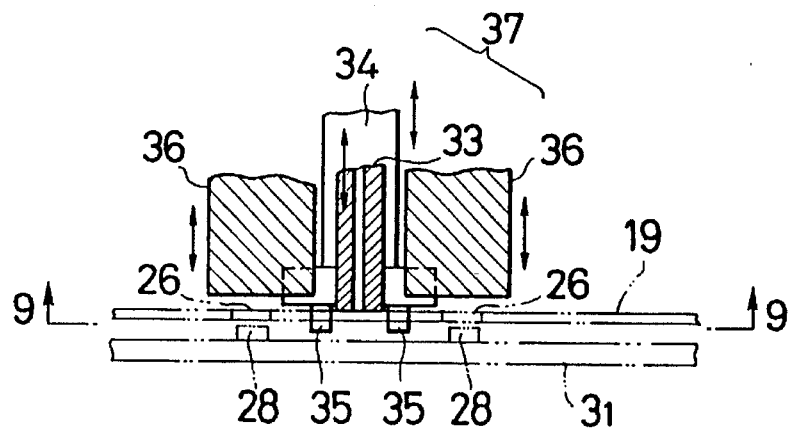
FIG. 8 is a front elevation view in section showing a mounting head, which is taken along line 8—8 of FIG. 9.
Figure 9:
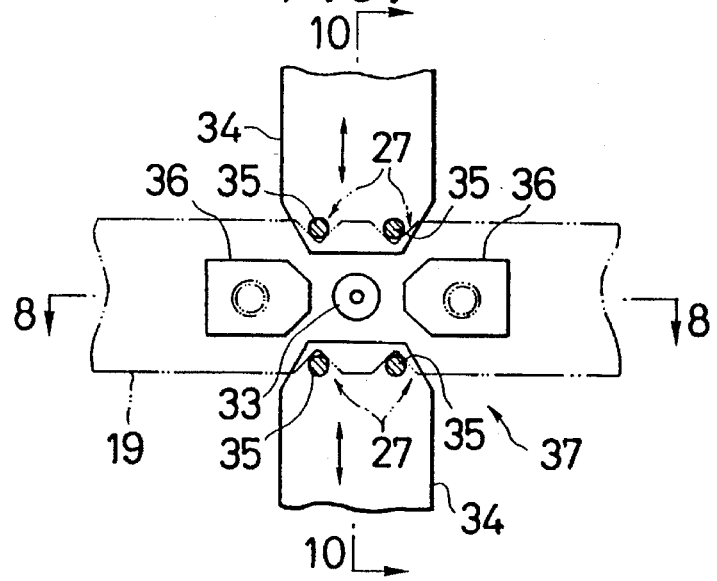
FIG. 9 is a sectional view taken along line 9—9 of FIG. 8.
Figure 10:
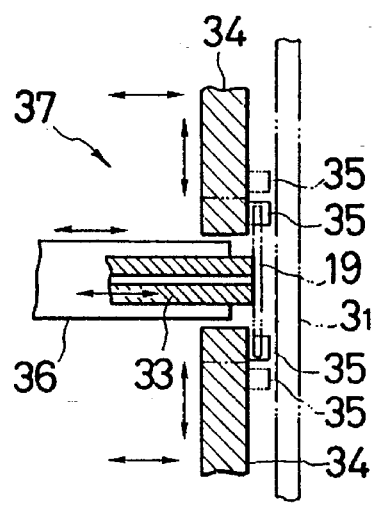
FIG. 10 is a sectional view taken along line 10—10 of FIG. 8.

Mounting of each of the so-stacked reel springs 19 on each of the casings 3 is carried out using a mounting head 37 of which an essential part is constructed in such a manner as shown in FIGS. 8 to 10. The mounting head 37 includes a suction nozzle 33 arranged in a manner to be movable in a three-dimensional direction or in X-, Y- and Z-directions and connected to a vacuum source (not shown) to hold the reel spring 19 thereon by suction. The mounting head 37 also includes a pair of guide members 34 disposed in a manner to interpose the suction nozzle 33 therebetween and each provided with a pair of guide pins 35. The guide members 34 are arranged so as to be three-dimensionally movable and selectively approachable to the suction nozzle 33. Further, the mounting head 37 includes a pair of heating elements 36 adapted to carry out. electrical heating, high-frequency heating or the like and arranged in a manner to be three-dimensionally movable. The suction nozzle 33, guide members 34 and heating elements 36 thus constituting the mounting head 37 which are movable in the X-, Y- and Z-directions are also arranged so as to be vertically movable relative to one another as required. It is not necessarily required to arrange the guide members 34 in a manner to be incorporated in the mounting head 37. In this instance, the guide members 34 may be arranged in proximity to a frame for holding the upper casing member $3_1$. Movement of the suction nozzle 33, guide members 34 and heating elements 36 in the X-, Y- and Z-directions may be accomplished using conventional suitable means such as a X-Y-Z table, cylinders, screws, racks or the like.

In mounting of the reel spring 19 on the casing 3, the guide members 34 are first moved in a direction away from each other to keep the guide pins 35 spaced from each other as indicated at phantom lines in FIG. 10. Then, the suction nozzle 33 is downwardly moved to hold uppermost one of the stacked reel springs 19 by suction and then moved to a position immediately above the upper casing member $3_1$, during which the guide members 34 are moved in a direction approachable to each other, resulting in the guide pins 35 being engaged with the recesses 27 of the sucked reel spring 19 to carry out positioning of the reel spring 19 in its longitudinal direction and a direction of its rotation about its vertical axis. Thus, subsequent downward movement of the suction nozzle 33 permits the mounting holes 26 of the reel spring 19 to be aligned with the mounting bosses 28 of the upper casing member $3_1$, to thereby facilitate engagement therebetween.

After the mounting holes 26 are fitted on the mounting bosses 28, the suction nozzle 33 is released from vacuum to put the reel spring 19 on the upper casing member $3_1$ and then the heating elements 36 each heat an upper end portion of each of the mounting bosses 28 to subject it to deformation by fusion or melting, resulting in secure mounting of the reel spring 19 on the upper casing member $3_1$.

Figure 11A:
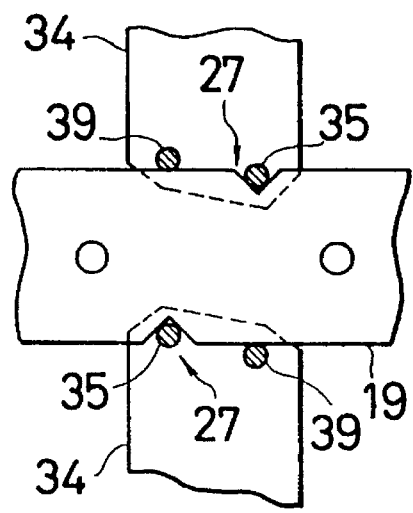
FIGS. 11A, 11B and 11C each are a bottom view showing a modification of a mounting head.
Figure 11B:
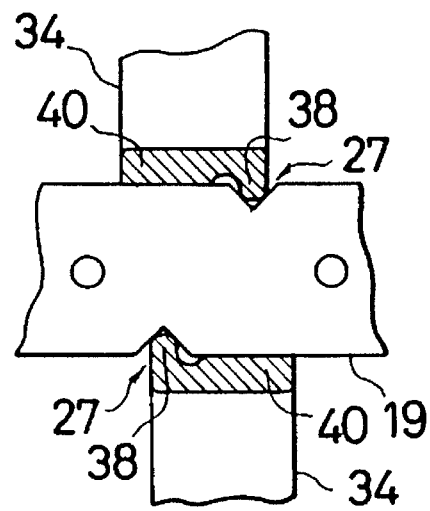
Figure 11C:
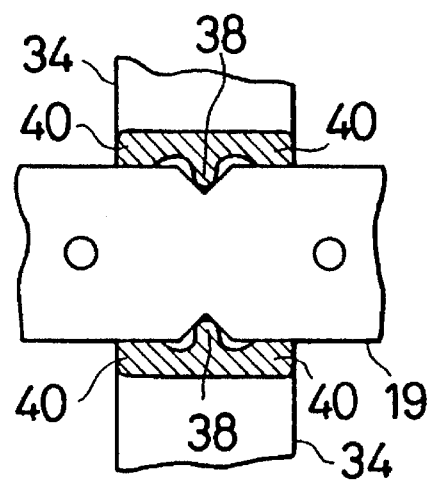

The reel spring 19 which is provided on each of both sides thereof with one recess 27 as shown in each of FIGS. 3A to 3D may be mounted on the upper casing member $3_1$ in such a manner as shown in each of FIGS. 11A to 11C. More particularly, this is accomplished by means of the guide members 34 provided with the guide pins 35 or guide projections 38 for carrying out positioning of the reel spring 19 in the longitudinal direction and provided with guide pins 39 or guide sections 40 which are arranged so as to be abutted against portions of both sides of the reel spring 19 free of the recesses 27 for carrying out positioning of the reel spring in the rotational direction.

As can be seen from the foregoing, in the magnetic tape cassette of the present invention, mounting of the reel spring on the casing or upper casing member is carried out while carrying out positioning of the reel spring in the longitudinal and rotational directions using the recesses formed on both sides of the reel spring and/or the both sides, resulting in facilitating alignment between the mounting holes of the reel spring and the mounting bosses of the upper casing member. Thus, the mounting is easily and positively accomplished to a degree sufficient to highly improve productivity and workability in manufacturing of the tape cassette. Also, such construction of the reel spring permits a width of the reel spring to be significantly reduced, resulting in increasing yields of a material for the reel spring and saving of the material.

While a preferred embodiment of the invention has been described with a certain degree of particularity with reference to the drawings, obvious modifications and variations are possible in the light of the above teachings. It is therefore to be understood that within the scope of the appended claims, the invention may be practiced otherwise than as specifically described.

What is claimed is:

1. A tape cassette in which a reel spring is precisely located by guiding means having respective guiding tools, comprising:

a casing in which a pair of tape reels having a tape wound thereon are rotatably arranged in a longitudinal direction of said casing, said casing including a plurality of mounting bosses aligned with each other and substantially parallel to said longitudinal direction;

a reel spring comprising an elongated, substantially rectangular spring body including first and second opposed elongated sides arranged in said longitudinal direction, said first and second opposed elongated sides defining first and second opposing ends of said spring body and an intermediate portion located between said first and second opposing ends, said first and second opposing ends of said spring body abutting against said tape reels for elastically holding said tape reels, said intermediate portion of said spring body including first and second mounting holes aligned with each other in said longitudinal direction and located between said first and second opposed elongated sides, first and second positioning means arranged in association with said first and second opposed elongated sides, respectively, for precisely locating said spring in said longitudinal direction in said casing and such that said mounting holes are aligned with corresponding ones of said mounting bosses, said first and second positioning means comprising first and second positioning recesses, respectively, located between said first and second mounting holes in said intermediate portion of said spring body, whereby said first and second positioning recesses engage with respective guiding tools of the guiding means during assembly of said spring in said casing.

2. A tape cassette as defined in claim 1, wherein said first and second positioning recesses are cutouts formed in each of said first and second opposed elongated sides.

3. A tape cassette as defined in claim 1, wherein said first and second positioning recesses have a substantially V-shape and are formed in each of said first and second opposed elongated sides.

4. A tape cassette as defined in claim 1, wherein said first and second positioning recesses have a substantially semi-circular shape and are formed in each of said first and second opposed elongated sides.

5. A tape cassette as defined in claim 1, wherein said spring body is downwardly curved in the longitudinal direction.

6. A tape cassette as defined in claim 1, wherein at least one of said mounting holes is formed into an elliptical shape which is elongated in the longitudinal direction of said spring body.

* * * * *